US012803255B2

(12) United States Patent
Umehara

(10) Patent No.: US 12,803,255 B2
(45) Date of Patent: Nov. 17, 2026

(54) WIRING SYSTEM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Taku Umehara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 215 days.

(21) Appl. No.: 18/728,453

(22) PCT Filed: Dec. 26, 2022

(86) PCT No.: PCT/JP2022/048039
§ 371 (c)(1),
(2) Date: Jul. 12, 2024

(87) PCT Pub. No.: WO2023/136124
PCT Pub. Date: Jul. 20, 2023

(65) Prior Publication Data

US 2025/0158368 A1 May 15, 2025

(30) Foreign Application Priority Data

Jan. 14, 2022 (JP) ................................ 2022-004235

(51) Int. Cl.
*H02G 3/16* (2006.01)
*B60R 16/02* (2006.01)

(52) U.S. Cl.
CPC .......... *H02G 3/16* (2013.01); *B60R 16/0215* (2013.01)

(58) Field of Classification Search
None
See application file for complete search history.

(56) References Cited

U.S. PATENT DOCUMENTS 6,503,098 B2 * 1/2003 Aoki .................. B60R 16/0207 439/502
10,522,267 B2 * 12/2019 Sugimoto .......... B60R 16/0215
(Continued)

FOREIGN PATENT DOCUMENTS

JP 2016-015809 A 1/2016
JP 2016-147558 A 8/2016
(Continued)

OTHER PUBLICATIONS

International Search Report issued on Mar. 14, 2023 for WO 2023/136124 A1 (5 pages).

*Primary Examiner* — Krystal Robinson
(74) *Attorney, Agent, or Firm* — LICA, Inc.

(57) ABSTRACT

A wiring system (10) according to an aspect of the present disclosure includes: an electrical junction box (30); a standard harness (40) electrically connecting the electrical junction box (30) and a standard device (20A); an expansion harness (50) electrically connected to the electrical junction box (30), and a standby connector (60) attached to an end portion of the expansion harness (50). The expansion harness (50) is not physically connected to the standard harnesses (40) and is provided independently from the standard harnesses (40). The standby connector (60) is not used at an initial stage, and electrically connectable, through connector connection, to an expansion unit (70) to be retrofitted to a vehicle (V).

9 Claims, 7 Drawing Sheets

(56) References Cited

U.S. PATENT DOCUMENTS

| | | | | |
|---|---|---|---|---|
| 12,109,953 | B2 * | 10/2024 | Yuan | B60R 16/023 |
| 2015/0349471 | A1 * | 12/2015 | Maki | B60R 16/0215 307/10.1 |
| 2018/0090896 | A1 | 3/2018 | Washio et al. | |
| 2018/0334117 | A1 | 11/2018 | Matsunaga et al. | |
| 2021/0291852 | A1 | 9/2021 | Hiramatsu et al. | |
| 2022/0355748 | A1 | 11/2022 | Jinno et al. | |
| 2023/0192019 | A1 * | 6/2023 | Martin | B60R 16/0207 174/72 A |

FOREIGN PATENT DOCUMENTS

| | | | | | |
|---|---|---|---|---|---|
| JP | 2016-207487 | A | | 12/2016 | |
| JP | 2017-149332 | A | | 8/2017 | |
| JP | 6401947 | B2 | * | 10/2018 | |
| JP | 2020172162 | A | * | 10/2020 | H02G 3/30 |
| JP | 2021-009816 | A | | 1/2021 | |
| JP | 2021-146867 | A | | 9/2021 | |

* cited by examiner

WIRING SYSTEM

CROSS REFERENCE TO RELATED APPLICATIONS

This application is a national phase of PCT application No. PCT/JP2022/048039, filed on 26 Dec. 2022, which claims priority from Japanese patent application No. 2022-004235, filed on 14 Jan. 2022, all of which are incorporated herein by reference.

TECHNICAL FIELD

The present disclosure relates to a wiring system.

BACKGROUND

Conventionally, vehicles such as automobiles are provided with multiple number of electrical devices. Power of a battery installed in the vehicle is distributed to the electrical devices via an electrical junction box such as a fuse box, a junction box, or a relay box (see, for example, Patent Document 1).

PRIOR ART DOCUMENT

Patent Document

Patent Document 1: JP 2016-147558 A

SUMMARY OF THE INVENTION

Problems to be Solved

Meanwhile, after vehicles have been placed on the market, electrical devices may be retrofitted to the vehicles to add systems and functions. Also, electrical devices may be retrofitted to vehicles to accommodate, for example, the presence or absence of electrical devices due to differences in specifications of the vehicles. It is desired to improve the assembly workability when retrofitting such electrical devices.

It is an object of the present disclosure to provide a wiring system that can improve the assembly workability.

Means to Solve the Problem

The wiring system according to the present disclosure is directed to a wiring system that is installed in a vehicle, the wiring system including: an electrical junction box; a standard harness electrically connecting the electrical junction box and a standard device; an expansion harness electrically connected to the electrical junction box; and a standby connector attached to an end portion of the expansion harness, wherein the expansion harness is not physically connected to the standard harness and is provided independently from the standard harness, and the standby connector is not used at an initial stage, and is electrically connectable, through connector connection, to an expansion unit to be retrofitted to the vehicle.

Effect of the Invention

The wiring system of the present disclosure achieves an effect of enabling an improvement in the assembly workability.

DETAILED DESCRIPTION TO EXECUTE THE INVENTION

Description of Embodiment of Present Disclosure

Figure 1:
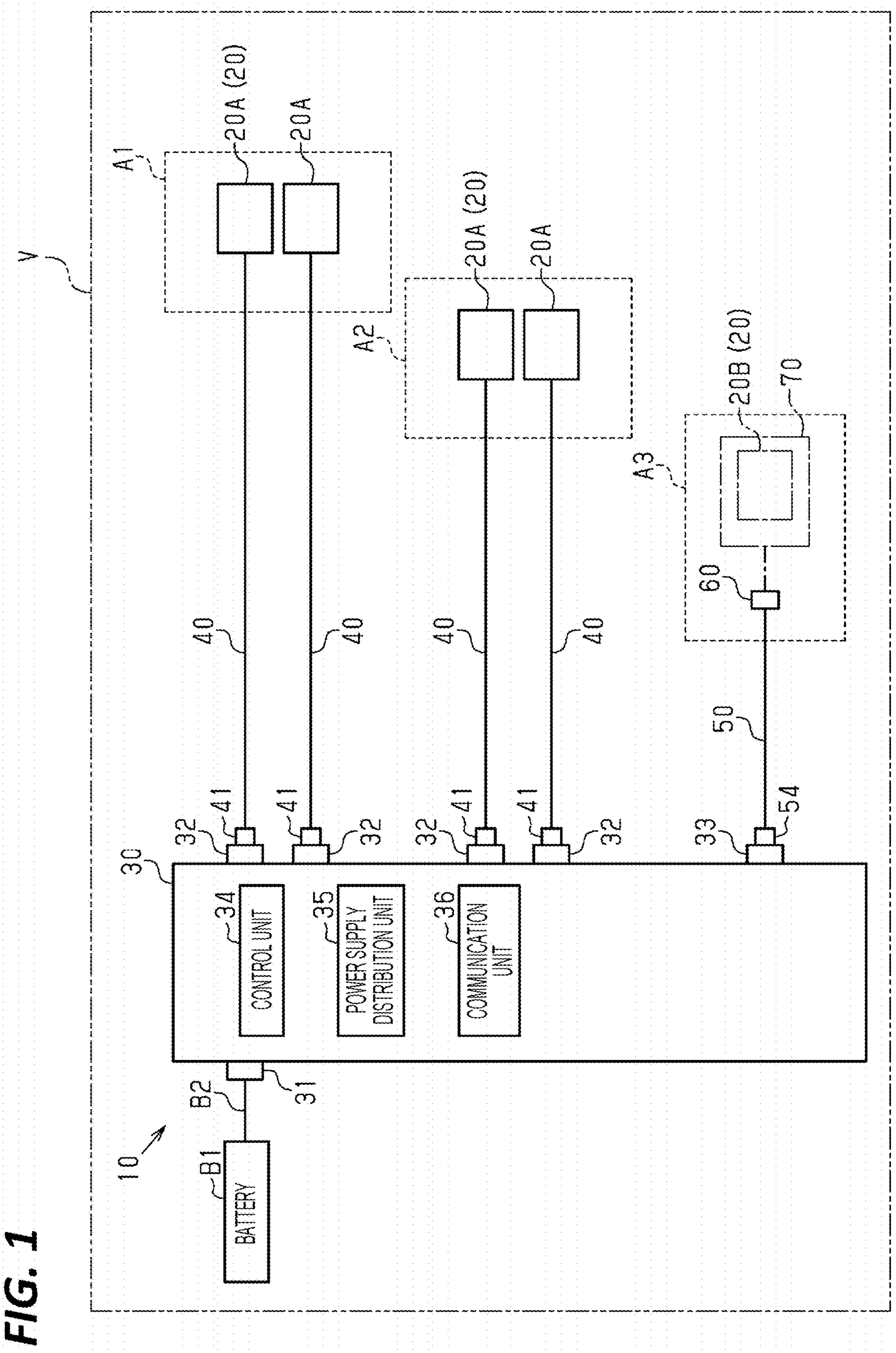
FIG. 1 is a diagram schematically illustrating a configuration of a wiring system according to an embodiment.

First, embodiments of the present disclosure are listed and described.

[1] The wiring system according to the present disclosure is directed to a wiring system that is installed in a vehicle, the wiring system including: an electrical junction box; a standard harness electrically connecting the electrical junction box and a standard device; an expansion harness electrically connected to the electrical junction box; and a standby connector attached to an end portion of the expansion harness, wherein the expansion harness is not physically connected to the standard harness and is provided independently from the standard harness, and the standby connector is not used at an initial stage, and is electrically connectable, through connector connection, to an expansion unit to be retrofitted to the vehicle.

According to this configuration, the standby connector, which is connector-connectable to the expansion unit, is attached to an end portion of the expansion harness electrically connected to the electrical junction box. This standby connector is not used at an initial stage and is waiting for the expansion unit to be connected while being electrically connected to the electrical junction box via the expansion harness. Here, "an initial stage" in the present specification refers to a state before the expansion unit is retrofitted. In other words, the standby connector is prepared, that is, pre-planned, for the electrical junction box from the state before the expansion unit is retrofitted. Accordingly, when retrofitting the expansion unit, the expansion unit can be connector-connected to the prepared standby connector, so that the expansion unit is electrically connected to the electrical junction box via the standby connector and the expansion harness. In other words, it is possible to retrofit the expansion unit simply by connector-connecting the expansion unit to the standby connector. This makes it possible to improve the assembly workability when retrofitting the expansion unit.

Also, since the standby connector is attached to an end portion of the expansion harness, routing the expansion harness allows the standby connector to be disposed at a position away from the electrical junction box. With this, even if the area where the expansion unit is to be installed is away from the electrical junction box, the standby connector can be suitably arranged in the area where the expansion unit is to be installed. As a result, when retrofitting the expansion unit, connection work between the expansion unit and the standby connector can be made easy because the standby connector is arranged near the expansion unit. Thus, the assembly workability when retrofitting the expansion unit can be improved.

Furthermore, the expansion harness is not physically connected to the standard harness and is provided independently from the standard harness. In other words, the expansion harness is not physically connected to the standard harness by crimping, welding, or the like. Accordingly, when retrofitting the expansion unit, there is no need to physically connect the expansion harness and the standard harness by crimping or the like. Therefore, the assembly workability when retrofitting the expansion unit can be improved compared to a case where, when retrofitting the expansion unit, the expansion harness is connected to the standard harness by crimping, welding, or the like, and the expansion unit is connected to this expansion harness.

[2] Preferably, the expansion unit connector-connected to the standby connector is provided, the expansion unit includes an expansion device including: an expansion load to be retrofitted to the vehicle, a load harness electrically connected to the expansion load, and a load connector attached to an end portion of the load harness, and the load connector is connector-connectable to the standby connector.

According to this configuration, the load connector of the expansion device is connector-connectable to the standby connector. Accordingly, by connector-connecting the load connector to the standby connector, it is possible to electrically connect the expansion load to the electrical junction box via the load harness, the load connector, the standby connector, and the expansion harness. In other words, it is possible to retrofit the expansion device by connector-connecting the load connector to the standby connector.

[3] Preferably, the expansion unit further includes a joint connector electrically connected to the standby connector, and the joint connector includes: a single joint connector-side input connector connector-connected to the standby connector; a plurality of joint connector-side output connectors that are connector-connectable to the load connector; and a joint connector-side power supply distribution unit configured to distribute power input to the joint connector-side input connector to the plurality of joint connector-side output connectors.

According to this configuration, by connector-connecting the single joint connector-side input connector of the joint connector to the standby connector, the joint connector is electrically connected to the standby connector. The joint connector includes the plurality of joint connector-side output connectors, which are each connector-connectable to a load connector. Accordingly, it is possible to electrically connect a plurality of expansion devices to the single joint connector by connector-connecting the load connectors to the respective joint connector-side output connectors. Furthermore, the joint connector includes the joint connector-side power supply distribution unit, which distributes power input to the joint connector-side input connector to the plurality of joint connector-side output connectors. Accordingly, it is possible to easily supply power to the plurality of expansion devices connected to the joint connector. As a result, the plurality of expansion devices can be retrofitted to the single standby connector.

[4] Preferably, the expansion unit further includes an auxiliary connector electrically connected to any of the joint connector-side output connectors, and the auxiliary connector includes: a control function unit configured to control an operation of the expansion device; an auxiliary connector-side input connector connector-connected to the joint connector-side output connector; and an auxiliary connector-side output connector connector-connectable to the load connector.

According to this configuration, the auxiliary connector is electrically connected to the joint connector by connector-connecting the auxiliary connector-side input connector of the auxiliary connector to the joint connector-side output connector. The auxiliary connector includes the auxiliary connector-side output connector, which is connector-connectable to the load connector. Accordingly, by connector-connecting the load connector to the auxiliary connector-side output connector, it is possible to electrically connect the expansion device to the auxiliary connector. Therefore, it is possible to electrically connect the auxiliary connector and the expansion device to the joint connector-side output connector. Furthermore, the auxiliary connector includes the control function unit that controls an operation of the expansion device. With this control function unit, the operation of the expansion device can be suitably controlled. For example, providing the control function unit enables not only simple power on/off control of the expansion device, but also detailed temperature control, PWM (Pulse Width Modulation) control, and the like.

[5] Preferably, the expansion unit includes a plurality of the expansion devices respectively electrically connected to the plurality of joint connector-side output connectors, and the load connectors of the plurality of expansion devices are connector-connectable to the respective joint connector-side output connectors, and are connector-connectable to the auxiliary connector-side output connector.

According to this configuration, the load connectors of the expansion devices are connector-connectable to the respective joint connector-side output connectors and are connector-connectable to the auxiliary connector-side output connector. Therefore, if the control function unit of the auxiliary connector is not needed, an expansion device can be directly connected to the corresponding joint connector by connector-connecting the load connector to the joint connector-side output connector. Also, if the control function unit of the auxiliary connector is needed, the expansion device can be indirectly connected to the joint connector via the auxiliary connector, by connector-connecting the auxiliary connector-side input connector to the joint connector-side output connector and connector-connecting the load connector to the auxiliary connector-side output connector.

[6] Preferably, the expansion unit further includes an auxiliary connector electrically connected to the standby connector, and the auxiliary connector includes: a control function unit configured to control an operation of the expansion device; an auxiliary connector-side input connector connector-connected to the standby connector; and an auxiliary connector-side output connector connector-connected to the load connector.

According to this configuration, when the auxiliary connector-side input connector of the auxiliary connector is connector-connected to the standby connector, the auxiliary connector is electrically connected to the standby connector. Also, when the load connector is connector-connected to the auxiliary connector-side output connector of the auxiliary connector, the expansion device is electrically connected to the auxiliary connector. With this, a single auxiliary connector and a single expansion device can be electrically connected to a single standby connector. Furthermore, the auxiliary connector includes the control function unit that controls an operation of the expansion device. With this control function unit, the operation of the expansion device can be suitably controlled.

[7] Preferably, the electrical junction box includes: a standard connector electrically connected to the standard harness; and an expansion connector electrically connected to the expansion harness, a harness-side connector is attached to an end portion of the expansion harness in a length direction thereof that is opposite to the standby connector, and the harness-side connector is connector-connected to the expansion connector.

According to this configuration, the electrical junction box includes the expansion connector, and the harness-side connector attached to the end portion of the expansion harness is connector-connected to this expansion connector. Thus, due to the connector-connection between the harness-side connector and the expansion connector, the expansion harness is electrically connected to the electrical junction box. Therefore, by disconnecting the connector-connection between the harness-side connector and the expansion connector, it is possible to remove the expansion harness from the electrical junction box. Therefore, the type of the expansion harness can be selected as appropriate according to the specifications of the vehicle, and the like.

[8] Preferably, the electrical junction box includes a power supply line, a ground line, and a signal line, and the expansion harness includes: a power supply wire electrically connected to the power supply line; a ground wire electrically connected to the ground line; and a signal wire electrically connected to the signal line.

According to this configuration, the power supply wire, the ground wire, and the signal wire of the expansion harness are respectively electrically connected to the power supply line, the ground line, and the signal line of the electrical junction box. Therefore, when the expansion unit is electrically connected to the standby connector, for example, power, a control signal, and the like can be suitably supplied from the electrical junction box to the expansion unit.

[9] Preferably, the wiring system includes: a plurality of the expansion harnesses individually connected to the electrical junction box; and a plurality of the standby connectors respectively attached to end portions of the plurality of expansion harnesses, wherein the plurality of standby connectors are provided in different installation areas of the vehicle.

According to this configuration, the plurality of standby connectors can be arranged in a distributed manner in the plurality of installation areas. Therefore, the plurality of standby connectors can be provided in the respective installation areas in which the expansion unit is to be installed. With this, even if expansion units are retrofitted to the plurality of installation areas, the standby connectors can be provided near the respective expansion units. This makes it possible to easily perform connection work between the expansion units and the standby connectors. For example, there is no need to route the wires for connecting the expansion devices of the expansion units to the standby connectors across the plurality of installation areas, and thus connection work between the expansion units and the standby connectors can be made easy.

Details of Embodiments of Present Disclosure

The following will describe specific examples of the wiring system according to the present disclosure with reference to the drawings. In the drawings, for ease of description, part of a configuration may be exaggerated or simplified. Furthermore, the dimensional ratios of constituent components may be different between the drawings. Note that the present invention is not limited to these examples but is defined by the claims, and all modifications within the meaning and scope equivalent to the claims are intended to be included.

Overall Configuration of Wiring System 10

A wiring system 10 shown in FIG. 1 is installed in a vehicle V such as an automobile. In the vehicle V, a plurality of installation areas are set where electrical devices 20 are disposed. Suitable number and location of the installation areas can be set according to the vehicle type, grade, shipping destination, and rank of the vehicle V. In the vehicle V, for example, two to more than ten installation areas are set. In the vehicle V of the present embodiment, three installation areas, namely, an installation area A1, an installation area A2, and an installation area A3, are set. The installation area A1 is set, for example, in the vicinity of an engine room provided in a front portion of the vehicle V. The installation area A2 is set, for example, at a position of the vehicle V rearward relative to the installation area A1. The installation area A3 is set, for example, in the vicinity of a seat of the vehicle V or in the vicinity of a door of the vehicle V. The installation area A3 of the present embodiment is set in the vicinity of the seat of the vehicle V.

The wiring system 10 is used, for example, to distribute power of a battery B1 installed in the vehicle V to the plurality of electrical devices 20. That is, the wiring system 10 is used to electrically connect the battery B1 to the plurality of electrical devices 20. The plurality of electrical devices 20 include, for example, two standard devices 20A installed in the installation area A1 and two standard devices 20A installed in the installation area A2. The plurality of electrical devices 20 include, for example, at least one expansion device 20B to be retrofitted to the installation area A3. The standard devices 20A are, for example, electrical devices essential for the vehicle V. For example, the standard devices 20A are electrical devices that must be installed in the vehicle V regardless of the vehicle type, grade, and shipping destination of the vehicle V. Examples of the standard devices 20A may include head lamps and windshield wipers. The expansion device 20B is an electrical device that is to be retrofitted to the vehicle V. The expansion device 20B is, for example, an electrical device that is to be retrofitted to the vehicle V to add and change a system and a function after the manufacturing of the vehicles V. The expansion device 20B is, for example, an electrical device that is not attached to the vehicle V during the manufacturing in a factory and is to be retrofitted to the vehicle V when, for example, a function is to be added. The expansion device 20B is, for example, an electrical device that is to be selectively retrofitted to the vehicle V. The expansion device 20B is, for example, an electrical device that can be installed in the vehicle V as an option. The expansion device 20B may or may not be installed in the vehicle V, for example, depending on the vehicle type, grade, and shipping destination of the vehicle V. Examples of the expansion device 20B can include a seat heater and a security device.

The wiring system 10 includes an electrical junction box 30, and standard harnesses 40 that electrically connect the electrical junction box 30 to the standard devices 20A. The wiring system 10 includes an expansion harness 50 electrically connected to the electrical junction box 30, and a standby connector 60 attached to an end portion of the expansion harness 50. The wiring system 10 includes a wire B2 that electrically connects the battery B1 and the electrical junction box 30. The standby connector 60 is not used at an initial stage, and electrically connectable, through connector connection, to an expansion unit 70 that is to be retrofitted to the vehicle V. The expansion unit 70 includes at least one expansion device 20B. The electrical junction box 30 has a function to distribute power supplied from the battery B1 to the plurality of electrical devices 20. Also, the electrical junction box 30 also functions as, for example, an electronic control unit (ECU) for electronically controlling the plurality of electrical devices 20. Note that the electrical junction box 30 may be referred to also as a junction box, a fuse box, a relay box, or a power supply box.

Configuration of Electrical Junction Box 30

The electrical junction box 30 includes, for example, a power receiving terminal 31 electrically connected to the battery B1 via the wire B2, a plurality of standard connectors 32 to which the respective standard harnesses 40 are electrically connected, and at least one expansion connector 33 to which the expansion harness 50 is electrically connected. The power receiving terminal 31 is a terminal that receives power supplied from the battery B1 via the wire B2. The plurality of standard connectors 32 are respectively electrically connected to the plurality of standard devices 20A via the standard harnesses 40. The electrical junction box 30 of the present embodiment includes four standard connectors 32 respectively electrically connected to four standard devices 20A. The expansion connector 33 is electrically connectable to the expansion unit 70 via the expansion harness 50 and the standby connector 60. The electrical junction box 30 of the present embodiment includes one expansion connector 33.

The electrical junction box 30 includes, for example: a control unit 34 that generates a control signal for controlling the plurality of electrical devices 20; a power supply distribution unit 35 for distributing power supplied from the battery B1 to the standard connectors 32 and the expansion connector 33; and a communication unit 36. As the control unit 34, for example, a central processing unit (CPU) can be used. The power supply distribution unit 35 includes, for example, an electrical circuit constituted by busbars connected to fuses and relays, and the like. The electrical circuit of the power supply distribution unit 35 electrically connects the power receiving terminal 31 to the standard connectors 32 and the expansion connector 33 and distributes power input to the power receiving terminal 31 to multiple systems. The standard connectors 32 and the expansion connector 33 are supplied, through the power supply distribution unit 35, with power supply voltages of the same voltage level as that of the power supply voltage input to the power receiving terminal 31. Also, currents to be supplied to the standard connectors 32 and the expansion connector 33 are independently set based on the electrical devices 20 connected to the standard connectors 32 and the expansion connector 33. The communication unit 36 communicates with, for example, the plurality of electrical devices 20. For example, the communication unit 36 is a communication transceiver for transmitting and receiving wired or wireless communication.

Figure 2:
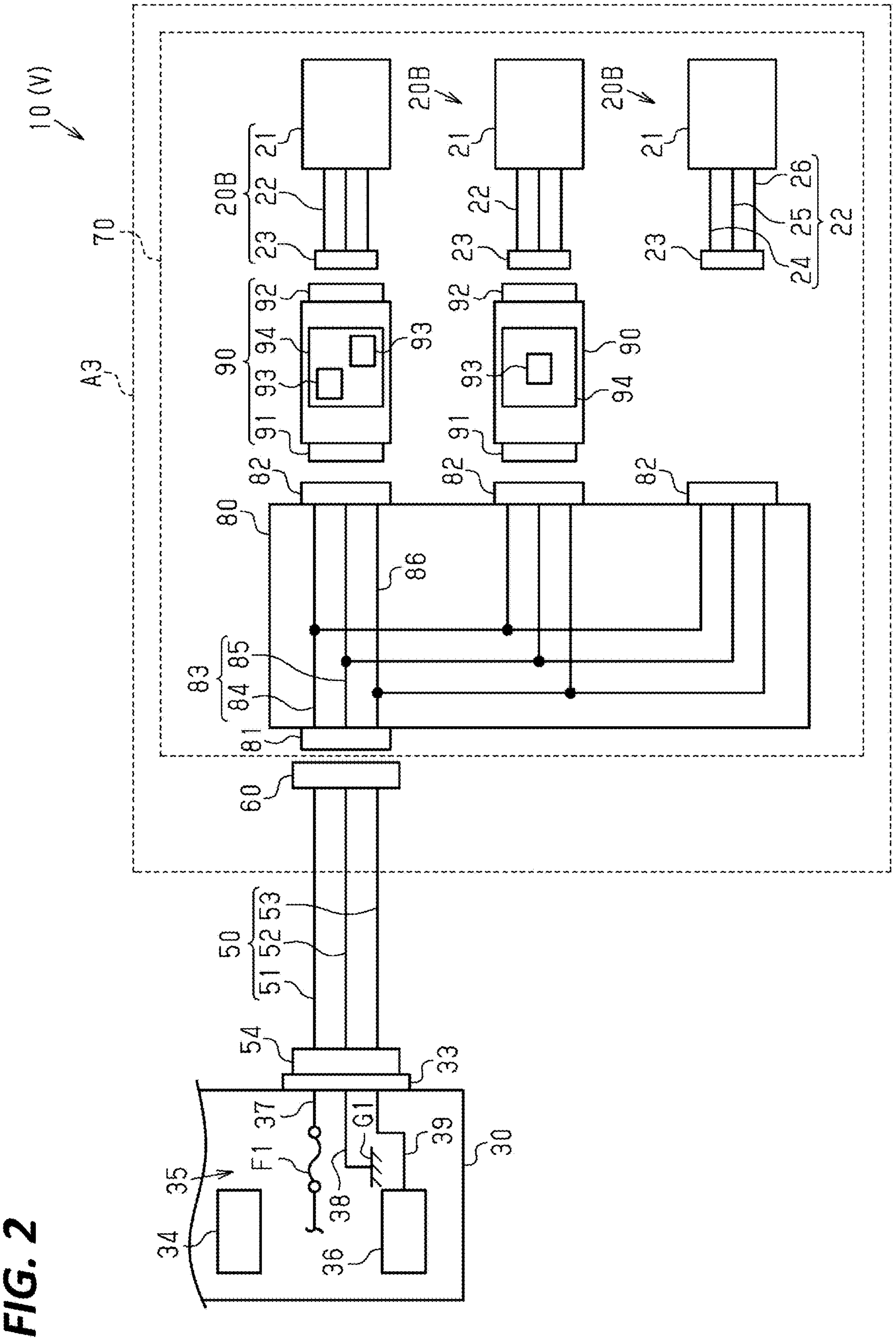
FIG. 2 is a diagram schematically illustrating a configuration of the wiring system according to the embodiment.

As shown in FIG. 2, the electrical junction box 30 includes, for example, a power supply line 37, a ground (GND) line 38, and a signal line 39. The power supply line 37 and the ground line 38 constitute the power supply distribution unit 35. Note that the power supply line 37, the ground line 38, and the signal line 39 are busbars, for example.

The power supply line 37 is electrically connected to the expansion connector 33, for example. The power supply line 37 is electrically connected to a fuse F1, for example. The power supply line 37 is electrically connected to, for example, the power receiving terminal 31 shown in FIG. 1. The power supply line 37 is electrically connected to, for example, the standard connectors 32 shown in FIG. 1. The ground line 38 is electrically connected to, for example, the expansion connector 33. The ground line 38 is connected to a ground position G1 provided on the vehicle body via the housing of the electrical junction box 30, for example. With this, the ground line 38 is connected to the ground at the ground position G1. The ground line 38 is electrically connected to, for example, the standard connectors 32 shown in FIG. 1.

The signal line 39 is electrically connected to the expansion connector 33, for example. The signal line 39 is electrically connected to, for example, the communication unit 36. For example, the communication unit 36 outputs the control signal generated by the control unit 34 to the expansion unit 70 via the signal line 39.

For example, the expansion connector 33 includes, although not shown, a power supply connection terminal electrically connected to the power supply line 37, a ground connection terminal electrically connected to the ground line 38, and a signal connection terminal electrically connected to the signal line 39. The various types of connection terminals of the expansion connector 33 are, for example, male terminals. The expansion connector 33 is, for example, a male connector. Similarly, the standard connectors shown in FIG. 1 each include a power supply connection terminal, a ground connection terminal, and a signal connection terminal. The various types of connection terminals of the standard connectors 32 are, for example, male terminals. The standard connectors 32 are, for example, male connectors.

Configuration of Expansion Harness 50

The expansion harness 50 is electrically connected to, for example, the expansion connector 33. The expansion harness 50 extends from, for example, the electrical junction box 30. The expansion harness 50 is routed, for example, to an area in which the expansion unit 70 is to be installed. The expansion harness 50 of the present embodiment is routed from the electrical junction box 30 to the installation area A3. Only one expansion harness 50 is connected to the single expansion connector 33.

The expansion harness 50 is not physically connected to the standard harnesses 40 and is provided independently from the standard harnesses 40. The expansion harness 50 does not have any branching connection section at an intermediate position of the expansion harness 50 in the length direction thereof, for example. Here, "branching connection section" in the present specification refers to a section at which two or more harnesses of different systems are physically connected to each other and the route is branched into two or more branches. The expansion harness 50 is, for example, a harness of a single system that is not physically connected to another harness such as the standard harness 40 by crimping, welding, or the like.

As shown in FIG. 2, the expansion harness 50 includes, for example, a single power supply wire 51, a single ground wire 52 (earth wire), and a single signal wire 53. The power supply wire 51 is electrically connected to, for example, the power supply line 37. For example, the power supply wire 51 supplies power distributed to the expansion connector 33 to the expansion unit 70 via the standby connector 60. The ground wire 52 is electrically connected to the ground line 38, for example. The signal wire 53 is electrically connected to the signal line 39, for example. Note that the power supply wire 51, the ground wire 52, and the signal wire 53 are each a coated wire in which the outer circumference of a conductive core wire is coated with an insulating coating having electrical insulation properties. For example, a twisted wire can be used as the signal wire 53. For example, by twisting a plurality of coated wires together, the twisted wire is obtained.

The single standby connector 60 is attached to one end portion of the expansion harness 50 in the length direction thereof, and a single harness-side connector 54 is attached to the other end portion of the expansion harness 50 in the length direction thereof. For example, the harness-side connector 54 can be connector-connected to the expansion connector 33. The harness-side connector 54 includes, although not shown, a power supply connection terminal, a ground connection terminal, and a signal connection terminal. The various types of connection terminals of the harness-side connector 54 are, for example, female terminals. The harness-side connector 54 is, for example, a female connector. For example, by fitting the harness-side connector 54 to the expansion connector 33, the harness-side connector 54 is electrically connected to the expansion connector 33. After the harness-side connector 54 has been connector-connected to the expansion connector 33, the power supply wire 51 is electrically connected to the power supply line 37, the ground wire 52 is electrically connected to the ground line 38, and the signal wire 53 is electrically connected to the signal line 39.

Configuration of Standby Connector 60

The standby connector 60 is provided, for example, in an area in which the expansion unit 70 is to be installed. The standby connector 60 of the present embodiment is provided, for example, in the installation area A3. That is to say, the standby connector 60 of the present embodiment is provided in the vicinity of the seat of the vehicle V. The standby connector 60 is electrically connectable to, for example, the expansion unit 70 through connector connection. Here, the standby connector 60 is electrically connected to the electrical junction box 30 from the initial stage before the expansion unit 70 is retrofitted to the vehicle V and is waiting for the expansion unit 70 to be connected. In other words, the standby connector 60 is prepared, that is, pre-planned, for the electrical junction box 30 from the state before the expansion unit 70 is retrofitted. The standby connector 60 is provided, for example, in the installation area A3 from the state before the expansion unit 70 is retrofitted. Therefore, the expansion unit 70 is not connected to the standby connector 60 at the initial stage before the expansion unit 70 is installed in the vehicle V. Furthermore, the standby connector 60 in this case is connected to none of the electrical devices 20 installed in the vehicle V. That is to say, the standby connector 60 is not used in the initial stage before the expansion unit 70 is retrofitted to the vehicle V and is waiting for the expansion unit 70 to be connected.

For example, the standby connector 60 includes, although not shown, a connection terminal electrically connected to the power supply wire 51, a connection terminal electrically connected to the ground wire 52, and a connection terminal electrically connected to the signal wire 53. The various types of connection terminals of the standby connector 60 are, for example, male terminals. The standby connector 60 is, for example, a male connector.

Configuration of Expansion Unit 70

The expansion unit 70 is retrofitted to the vehicle V. Upon being connector-connected to the standby connector 60, the expansion unit 70 is electrically connected to the electrical junction box 30. The expansion unit 70 is provided, for example, in the installation area A3. The expansion unit 70 is, for example, a seat heater unit provided in the vicinity of the seat of the vehicle V.

The expansion unit 70 includes, for example, a single joint connector 80, one or more auxiliary connectors 90, and one or more expansion devices 20B. The expansion unit 70 of the present embodiment includes a single joint connector 80, two auxiliary connectors 90, and three expansion devices 20B.

Configuration of Joint Connector 80

The joint connector 80 is electrically connectable to the standby connector 60. The joint connector 80 has a function to distribute power supplied from the standby connector 60 to multiple systems. The joint connector 80 is provided, for example, when multiple expansion devices 20B are connected to the single standby connector 60. In other words, if a single expansion device 20B is connected to the single standby connector 60, the expansion unit 70 does not need to have any joint connector 80.

The joint connector 80 includes a single joint connector-side input connector 81, a plurality of joint connector-side output connectors 82, and a joint connector-side power supply distribution unit 83. The joint connector 80 of the present embodiment includes three joint connector-side output connectors 82. The joint connector-side power supply distribution unit 83 includes a power supply line 84 and a ground line 85. The joint connector 80 includes a signal line 86, for example.

The joint connector-side input connector 81 is connector-connectable to the standby connector 60. For example, the joint connector-side input connector 81 includes, although not shown, a connection terminal electrically connected to the power supply line 84, a connection terminal electrically connected to the ground line 85, and a connection terminal electrically connected to the signal line 86. The various types of connection terminals of the joint connector-side input connector 81 are, for example, female terminals. The joint connector-side input connector 81 is, for example, a female connector. For example, by fitting the joint connector-side input connector 81 to the standby connector 60, the joint connector-side input connector 81 is electrically connected to the standby connector 60.

For example, each joint connector-side output connector 82 is connector-connectable to an auxiliary connector 90 and is connector-connectable to an expansion device 20B. For example, each joint connector-side output connector 82 includes, although not shown, a connection terminal electrically connected to the power supply line 84, a connection terminal electrically connected to the ground line 85, and connection terminal electrically connected to the signal line 86. The various types of connection terminals of each joint connector-side output connector 82 are, for example, male terminals. The joint connector-side output connectors 82 are, for example, male connectors.

The joint connector-side power supply distribution unit 83 distributes power input to the joint connector-side input connector 81 from the standby connector 60 to the plurality of joint connector-side output connectors 82. In other words, the joint connector-side power supply distribution unit 83 distributes, to the plurality of joint connector-side output connectors 82, power supplied from the battery B1 to the joint connector-side input connector 81 via the electrical junction box 30, the standby connector 60, and the like. The plurality of joint connector-side output connectors 82 are supplied, through the joint connector-side power supply distribution unit 83, with power supply voltages of the same voltage level as that of the power supply voltage input to the joint connector-side input connector 81. Currents to be supplied to the plurality of joint connector-side output connectors 82 are independently set based on the expansion devices 20B connected to the joint connector-side output connectors 82.

The power supply line 84 electrically connects the single joint connector-side input connector 81 to the plurality of joint connector-side output connectors 82. When the joint connector-side input connector 81 is connector-connected to the standby connector 60, the power supply line 84 is electrically connected to the power supply wire 51 of the expansion harness 50. The power supply line 84 includes, for example, a trunk line section connected to the single joint connector-side input connector 81 and a plurality of branch sections that branch off from that trunk line section and extend toward the respective joint connector-side output connectors 82. The branch sections of the power supply line 84 are electrically connected to the joint connector-side output connectors 82, respectively. The trunk line section and the branch sections of the power supply line 84 have the same voltage level. The power supply line 84 is a busbar, for example.

The ground line 85 electrically connects the single joint connector-side input connector 81 to the plurality of joint connector-side output connectors 82. When the joint connector-side input connector 81 is connector-connected to the standby connector 60, the ground line 85 is electrically connected to the ground wire 52 of the expansion harness 50. The ground line 85 includes, for example, a trunk line section connected to the single joint connector-side input connector 81 and a plurality of branch sections that branch off from that trunk line section and extend toward the respective joint connector-side output connectors 82. The branch sections of the ground line 85 are electrically connected to the joint connector-side output connectors 82, respectively. The trunk line section and the branch sections of the ground line 85 have the same voltage level. The ground line 85 is a busbar, for example.

The signal line 86 electrically connects the single joint connector-side input connector 81 to the plurality of joint connector-side output connectors 82. When the joint connector-side input connector 81 is connector-connected to the standby connector 60, the signal line 86 is electrically connected to the signal wire 53 of the expansion harness 50. The signal line 86 includes, for example, a trunk line section connected to the single joint connector-side input connector 81 and a plurality of branch sections that branch off from that trunk line section and extend toward the respective joint connector-side output connectors 82. The branch sections of the signal line 86 are electrically connected to the joint connector-side output connectors 82, respectively. The signal line 86 is a busbar, for example.

Configuration of Auxiliary Connector 90

Each auxiliary connector 90 is provided to assist in controlling the operation of the corresponding expansion device 20B, for example, when control by the control unit 34 of the electrical junction box 30 alone is not sufficient to drive the expansion device 20B with a desired operation. In other words, the auxiliary connector 90 does not need to be provided for all expansion devices 20B but is provided only when it is necessary depending on, for example, the type of expansion device 20B and the control method thereof.

The auxiliary connector 90 includes, for example, a single auxiliary connector-side input connector 91, a single auxiliary connector-side output connector 92, and a control function unit 93 that controls the operation of the expansion device 20B.

The auxiliary connector-side input connector 91 is connector-connectable to the joint connector-side output connector 82. The auxiliary connector-side input connector 91 is connector-connectable to, for example, the standby connector 60. For example, the auxiliary connector-side input connector 91 includes, although not shown, a wire connection terminal, a ground connection terminal, and a signal connection terminal. The various types of connection terminals of the auxiliary connector-side input connector 91 are, for example, female terminals. The auxiliary connector-side input connector 91 is, for example, a female connector. For example, by fitting the auxiliary connector-side input connector 91 to the joint connector-side output connector 82, the auxiliary connector-side input connector 91 is electrically connected to the joint connector-side output connector 82.

The auxiliary connector-side output connector 92 is connector-connectable to, for example, an expansion device 20B. For example, the auxiliary connector-side output connector 92 includes, although not shown, a wire connection terminal, a ground connection terminal, and a signal connection terminal. The various types of connection terminals of the auxiliary connector-side output connector 92 are, for example, male terminals. The auxiliary connector-side output connector 92 is, for example, a male connector.

The control function unit 93 generates, for example, a control signal for controlling the expansion device 20B. The control function unit 93 is, for example, an electronic control unit for electronically controlling the expansion device 20B. The control function unit 93 includes, for example, a microcomputer, a voltage regulator, input/output circuits, a communication transceiver, and the like. The circuit parts of the control function unit 93 are suitably set according to the type of expansion device 20B to be controlled, the control method thereof, and the like. For example, the control function unit 93 is electrically connected to the auxiliary connector-side input connector 91 and is electrically connected to the auxiliary connector-side output connector 92. The control function unit 93 is installed on a circuit substrate 94, for example. In other words, the auxiliary connector 90 includes the circuit substrate 94 that includes the control function unit 93.

Configuration of Expansion Device 20B

Figure 3:
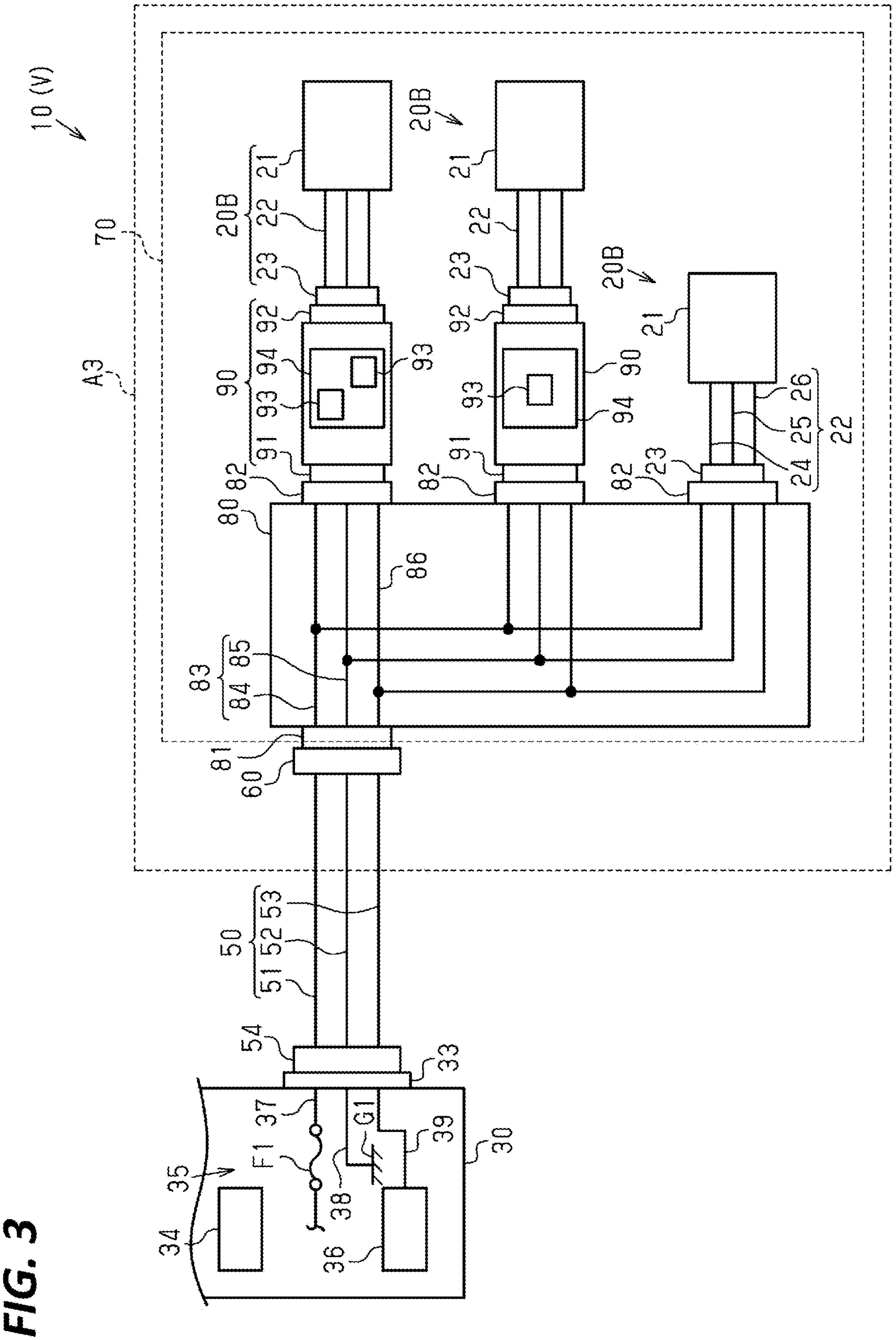
FIG. 3 is a diagram schematically illustrating a configuration of the wiring system according to the embodiment.

As shown in FIG. 3, among the plurality of expansion devices 20B, some expansion devices 20B, here, two expansion devices 20B from the top of the figure, are connected to the joint connector 80 via the respective auxiliary connectors 90. Among the plurality of expansion devices 20B, some expansion device 20B, here, the lowermost expansion device 20B in the figure, is directly connected to the joint connector 80.

Each expansion device 20B includes, for example, an expansion load 21 to be retrofitted to the vehicle V, a load harness 22 electrically connected to the expansion load 21, and a load connector 23 attached to an end portion of a load harness 22.

Examples of the expansion load 21 may include a sensor, a motor, a lamp, and a relay. When the expansion unit 70 is a seat heater unit, a temperature sensor can be used as the expansion load 21.

The load harness 22 extends from the expansion load 21, for example. The single expansion load 21 is connected to one end portion of the load harness 22 in a length direction thereof, and a single load connector 23 is attached to the other end portion of the load harness 22 in the length direction thereof. The one end portion of the load harness 22 is formed, for example, in one piece with the expansion load 21. For example, the one end portion of the load harness 22 is directly connected to an electrical circuit of the expansion load 21. The load harness 22 includes, for example, a single load-side power supply wire 24, a single load-side ground wire 25, and a single load-side signal wire 26. The load-side power supply wire 24 is electrically connected to the power supply wire 51 of the expansion harness 50 via the load connector 23 and the like. The load-side ground wire 25 is electrically connected to the ground wire 52 of the expansion harness 50 via the load connector 23 and the like. The load-side signal wire 26 is electrically connected to the signal wire 53 of the expansion harness 50 via the load connector 23 and the like. Note that the load-side power supply wire 24, the load-side ground wire 25, and the load-side signal wire 26 are each a coated wire in which the outer circumference of a conductive core wire is coated with an insulating coating having electrical insulation properties. For example, a twisted wire can be used as the load-side signal wire 26.

The load connector 23 is connector-connectable to the standby connector 60. The load connector 23 is connector-connectable to, for example, the joint connector-side output connector 82. The load connector 23 is connector-connectable to, for example, the auxiliary connector-side output connector 92. For example, the load connector 23 includes, although not shown, a connection terminal electrically connected to the load-side power supply wire 24, a connection terminal electrically connected to the load-side ground wire 25, and a connection terminal electrically connected to the load-side signal wire 26. The various types of connection terminals of the load connector 23 are, for example, female terminals. The load connector 23 is, for example, a female connector.

For example, by fitting the load connector 23 to the corresponding auxiliary connector-side output connector 92, the load connector 23 is electrically connected to the auxiliary connector-side output connector 92. Accordingly, the load harness 22 is electrically connected to the power supply line 37, the ground line 38, and the signal line 39 via the load connector 23, the auxiliary connector 90, the joint connector 80, the standby connector 60, the expansion harness 50, and the like. With this, power distributed into multiple systems by the electrical junction box 30 is supplied to the control function units 93 of the auxiliary connectors 90 and the expansion loads 21 of the expansion devices 20B. Also, the control signal generated by the control unit 34 is supplied to the expansion loads 21, and the control signals generated by the control function units 93 are supplied to the expansion loads 21. As a result, the expansion devices 20B retrofitted to the vehicle V, specifically, the expansion devices 20B electrically connected to the joint connector 80 via the auxiliary connector 90, can be driven by a desired operation.

For example, by fitting the load connector 23 to the joint connector-side output connector 82, the load connector 23 is electrically connected to the joint connector-side output connector 82. Accordingly, the load harness 22 is electrically connected to the power supply line 37, the ground line 38, and the signal line 39 via the load connector 23, the joint connector 80, the standby connector 60, the expansion harness 50, and the like. With this, power distributed by the electrical junction box 30 is supplied to the expansion load 21, and a control signal generated by the control unit 34 is supplied to the expansion load 21. As a result, the expansion device 20B retrofitted to the vehicle V, specifically, the expansion device 20B directly connected to the joint connector 80, can be driven by a desired operation.

Here, the standby connector 60 is connector-connectable to, for example, any of the joint connector-side input connector 81, the auxiliary connector-side input connector 91, and the load connector 23. Accordingly, the expansion device 20B can be directly connected to the standby connector 60, or the expansion device 20B can be connected to the standby connector 60 via the auxiliary connector 90. Therefore, the configuration of the expansion unit 70 connected to the standby connector 60 can be changed as appropriate.

Figure 4:
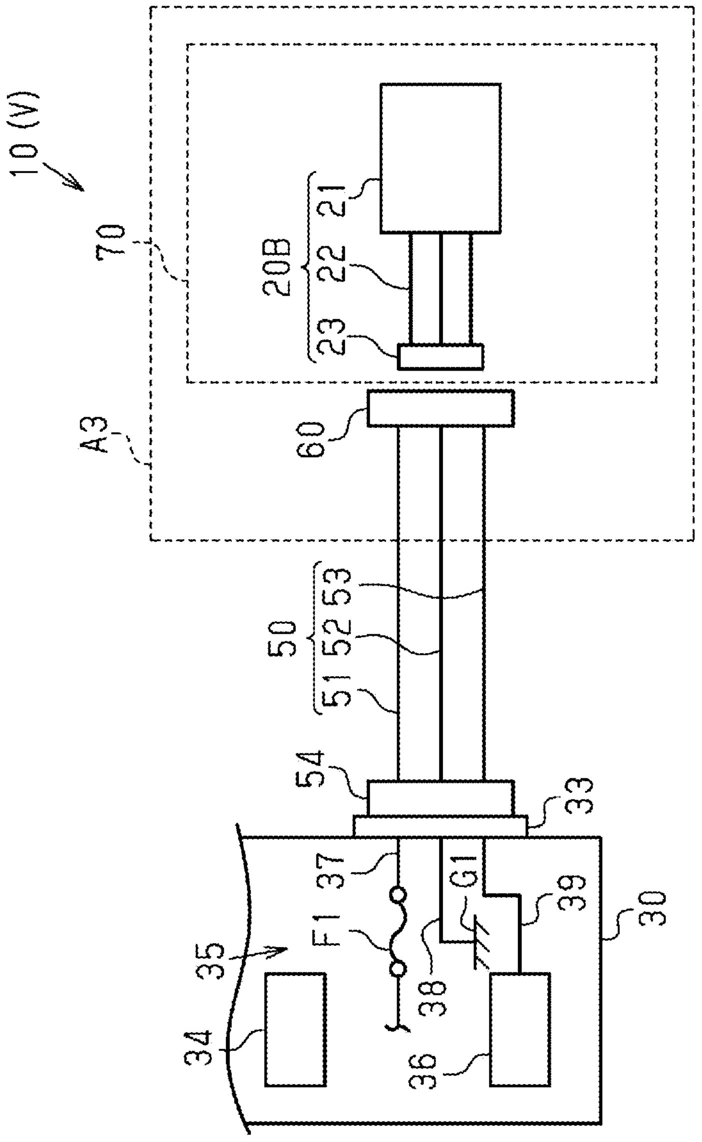
FIG. 4 is a diagram schematically illustrating a configuration of the wiring system according to a modification.

For example, as shown in FIG. 4, the expansion unit 70 can have a configuration in which it only includes a single expansion device 20B. In this case, the load connector 23 of the expansion device 20B is connector-connected to the standby connector 60. Accordingly, the load harness 22 is electrically connected to the power supply line 37, the ground line 38, and the signal line 39 via the load connector 23, the standby connector 60, the expansion harness 50, and the like. With this, power distributed by the electrical junction box 30 is supplied to the expansion load 21, and a control signal generated by the control unit 34 is supplied to the expansion load 21. As a result, the expansion device 20B retrofitted to the vehicle V, specifically, the expansion device 20B directly connected to the standby connector 60, can be driven by a desired operation.

Figure 5:
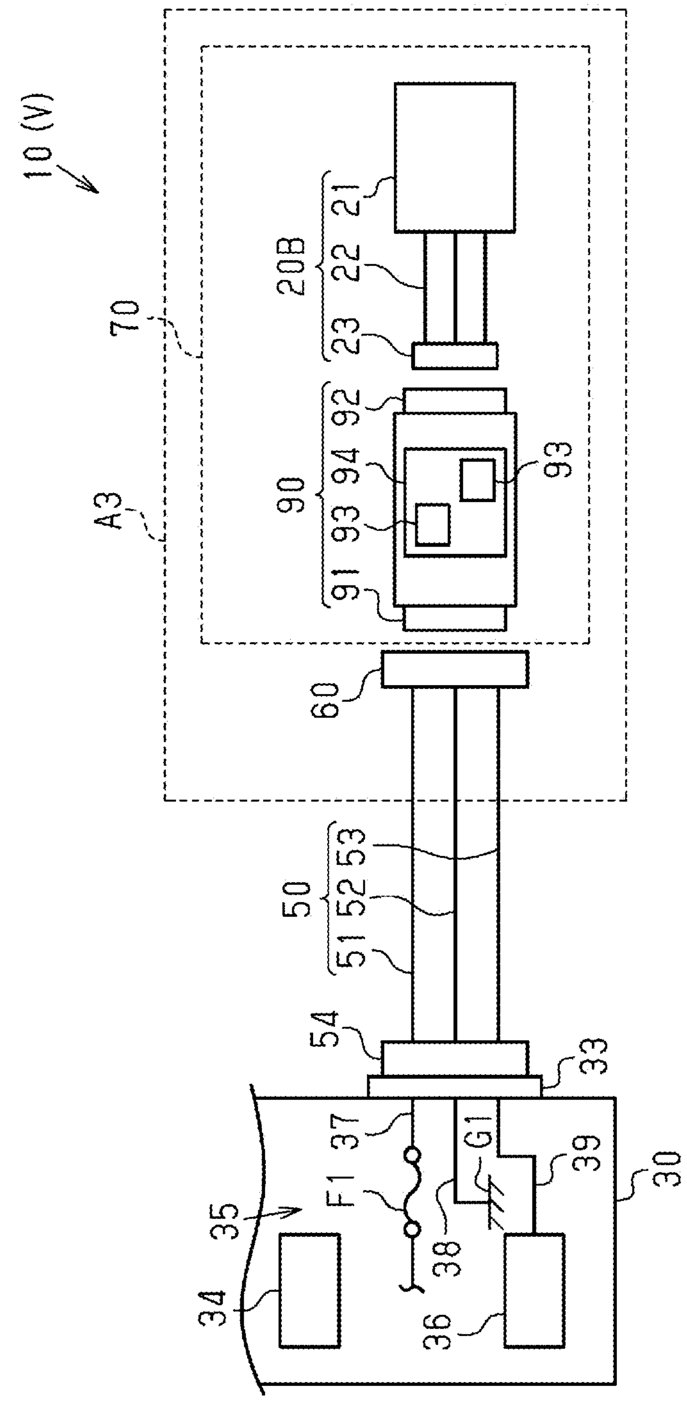
FIG. 5 is a diagram schematically illustrating a configuration of the wiring system according to a modification.

For example, as shown in FIG. 5, the expansion unit 70 can have a configuration in which it includes a single auxiliary connector 90 and a single expansion device 20B. In this case, the auxiliary connector-side input connector 91 of the auxiliary connector 90 is connector-connected to the standby connector 60, and the load connector 23 is connector-connected to the auxiliary connector-side output connector 92. Accordingly, the load harness 22 is electrically connected to the power supply line 37, the ground line 38, and the signal line 39 via the load connector 23, the auxiliary connector 90, the standby connector 60, the expansion harness 50, and the like. With this, power distributed by the electrical junction box 30 is supplied to the control function unit 93 of the auxiliary connector 90 and the expansion load 21 of the expansion device 20B. Also, the control signal generated by the control unit 34 is supplied to the expansion loads 21, and the control signals generated by the control function units 93 are supplied to the expansion loads 21. As a result, the expansion device 20B retrofitted to the vehicle V, specifically, the expansion device 20B electrically connected to the standby connector 60 via the auxiliary connector 90, can be driven by a desired operation.

As such, only the necessary number of expansion devices 20B can be retrofitted to the single standby connector 60. For example, when a single expansion device 20B is desired to be retrofitted to the vehicle V, as shown in FIGS. 4 and 5, the single expansion device 20B is directly connected to the standby connector 60, or the single expansion device 20B is connected to the standby connector 60 via the auxiliary connector 90. Also, when a plurality of expansion devices 20B are desired to be retrofitted to the vehicle V, as shown in FIGS. 2 and 3, the joint connector 80 having the power supply distribution function is connected to the single standby connector 60. Then, the plurality of expansion devices 20B are connected to the joint connector 80 directly or via the auxiliary connectors 90. With this, a plurality of expansion devices 20B can be electrically connected to the single standby connector 60. As such, only the necessary number of expansion devices 20B can be connected to the standby connector 60 when the need arises, thus suppressing the cost increase caused by pre-planning. In other words, there is no need to increase the number of standby connectors 60 according to the number of expansion devices 20B to be retrofitted, thus making it possible to suppress the cost increase caused by the installation of such standby connectors 60.

Configuration of Standard Harness 40

As shown in FIG. 1, the wiring system 10 includes, for example, the plurality of standard harnesses 40 electrically connected respectively to the plurality of standard connectors 32. The numbers of standard harnesses 40 and standard connectors 32 are set according to the number of standard devices 20A connected to the electrical junction box 30. In the wiring system 10 of the present embodiment, since four standard devices 20A are connected to the electrical junction box 30, four standard connectors 32 and four standard harnesses 40 are provided.

The standard harnesses 40 are provided independently from the expansion harness 50. The standard harnesses 40 extend from, for example, the electrical junction box 30. Each standard harness 40 is routed, for example, to an installation area where a destination standard device 20A is installed. Each standard harness 40 of the present embodiment is routed from the electrical junction box 30 to the installation area A1 or the installation area A2. A single standard device 20A is connected to one end portion of each standard harness 40 in the length direction thereof, and a single standard harness-side connector 41 is attached to the other end portion of the standard harness 40 in the length direction thereof. The one end portion of the standard harness 40 is formed in one piece with the standard device 20A, for example. For example, the one end portion of the standard harness 40 is directly connected to an electrical circuit of the standard device 20A. Note that, similar to the expansion harness 50, each standard harness 40 includes, for example, a single power supply wire, a single ground wire, and a single signal wire, although not shown.

For example, the standard harness-side connector 41 is connector-connectable to the standard connector 32. The standard harness-side connector 41 includes, although not shown, a power supply connection terminal, a ground connection terminal, and a signal connection terminal. The various types of connection terminals of the standard harness-side connector 41 are, for example, female terminals. The standard harness-side connector 41 is, for example, a female connector. For example, by fitting the standard harness-side connector 41 to the standard connector 32, the standard harness-side connector 41 is electrically connected to the standard connector 32. Accordingly, the standard harness 40 is electrically connected to the power supply line 37, the ground line 38, and the signal line 39 that are shown in FIG. 2, via the standard harness-side connector 41 and the standard connector 32. With this, power distributed by the electrical junction box 30 is supplied to the standard device 20A, and a control signal generated by the control unit 34 is supplied to the standard device 20A. As a result, the standard device 20A can be driven by a desired operation.

The following will describe advantageous effects of the present embodiment.

(1) The standby connector 60, which is connector-connectable to the expansion unit 70, is attached to an end portion of the expansion harness 50 electrically connected to the electrical junction box 30. The standby connector 60 is not used at an initial stage and is waiting for the expansion unit 70 to be connected while being electrically connected to the electrical junction box 30 via the expansion harness 50. In other words, the standby connector 60 is prepared, that is, pre-planned, for the electrical junction box 30 from the state before the expansion unit 70 is retrofitted. Accordingly, when retrofitting the expansion unit 70, the expansion unit 70 can be connector-connected to the prepared standby connector 60, so that the expansion unit 70 is connected to the electrical junction box 30 via the standby connector 60 and the expansion harness 50. In other words, it is possible to retrofit the expansion unit 70 simply by connector-connecting the expansion unit 70 to the standby connector 60. This makes it possible to improve the assembly workability when retrofitting the expansion unit 70.

(2) The standby connector 60 is attached to an end portion of the expansion harness 50. Accordingly, routing the expansion harness 50 allows the standby connector 60 to be disposed at a position away from the electrical junction box 30. With this, even if the area where the expansion unit 70 is to be installed is away from the electrical junction box 30, the standby connector 60 can be suitably arranged in the area where the expansion unit 70 is to be installed, namely, the installation area A3 in this embodiment. As a result, when retrofitting the expansion unit 70, connection work between the expansion unit 70 and the standby connector 60 can be made easy because the standby connector 60 is arranged near the expansion unit 70. For example, due to the standby connector 60 arranged near the expansion unit 70, the wiring length of the wire (for example, the load harness 22) connected from the standby connector 60 to the expansion device 20B in the expansion unit 70 can be reduced. Therefore, the load harness 22 can be easily routed. Thus, the assembly workability when retrofitting the expansion unit 70 can be improved.

(3) The expansion harness 50 is not physically connected to the standard harnesses 40 and is provided independently from the standard harnesses 40. In other words, the expansion harness 50 is not physically connected to any of the standard harnesses 40 by crimping, welding, or the like. Accordingly, when retrofitting the expansion unit 70, there is no need to physically connect the expansion harness 50 and the standard harness 40 by crimping or the like. Therefore, the assembly workability when retrofitting the expansion unit 70 can be improved compared to a case where, when retrofitting the expansion unit 70, the expansion harness 50 is connected to the standard harness 40 by crimping or the like, and the expansion unit 70 is connected to this expansion harness 50. When the standard harness 40 and the expansion harness 50 are physically and electrically connected to each other by crimping or the like, the insulation coating of the wires such as the power supply wire 51 and the ground wire 52 may be stripped at the connection part, and the wires may be damaged. In contrast, in the wiring system 10 of the present embodiment, the expansion harness 50 is not physically connected to the standard harness 40, and thus it is possible to suppress a quality deterioration in the expansion harness 50 and the standard harness 40.

(4) The load connector 23 of the expansion device 20B is connector-connectable to the standby connector 60. Accordingly, by connector-connecting the load connector 23 to the standby connector 60, it is possible to electrically connect the expansion load 21 to the electrical junction box 30 via the load harness 22, the load connector 23, the standby connector 60, and the expansion harness 50. In other words, it is possible to retrofit the expansion device 20B simply by connector-connecting the load connector 23 to the standby connector 60.

(5) When the expansion unit 70 includes the joint connector 80, by connector-connecting the joint connector-side input connector 81 of the joint connector 80 to the standby connector 60, the joint connector 80 is electrically connected to the standby connector 60. The joint connector 80 includes the plurality of joint connector-side output connectors 82, which are each connector-connectable to a load connector 23. Accordingly, it is possible to electrically connect a plurality of expansion devices 20B to the single joint connector 80 by connector-connecting the load connectors 23 to the respective joint connector-side output connectors 82. Furthermore, the joint connector 80 includes the joint connector-side power supply distribution unit 83, which distributes power input to the joint connector-side input connector 81 to the plurality of joint connector-side output connectors 82. Accordingly, it is possible to easily supply power to the plurality of expansion devices 20B connected to the joint connector 80. As a result, the plurality of expansion devices 20B can be retrofitted to the single standby connector 60.

(6) When the expansion unit 70 includes the auxiliary connector 90, the auxiliary connector 90 is electrically connected to the joint connector 80 by connector-connecting the auxiliary connector-side input connector 91 of the auxiliary connector 90 to the joint connector-side output connector 82. The auxiliary connector 90 includes the auxiliary connector-side output connector 92, which is connector-connectable to the load connector 23. Accordingly, by connector-connecting the load connector 23 to the auxiliary connector-side output connector 92, it is possible to electrically connect the expansion device 20B to the auxiliary connector 90. Therefore, it is possible to electrically connect the auxiliary connector 90 and the expansion device 20B to the joint connector-side output connector 82. Furthermore, the auxiliary connector 90 includes the control function unit 93 that controls an operation of the expansion device 20B. With this control function unit 93, the operation of the expansion device 20B can be suitably controlled. For example, providing the control function unit 93 enables not only simple power on/off control of the expansion device 20B, but also detailed temperature control, PWM control, and the like.

(7) The load connector 23 is connector-connectable to the joint connector-side output connector 82 and is connector-connectable to the auxiliary connector-side output connector 92. Therefore, if the control function unit 93 of the auxiliary connector 90 is not needed, the expansion device 20B can be directly connected to the joint connector 80 by connector-connecting the load connector 23 to the joint connector-side output connector 82. Also, if the control function unit 93 of the auxiliary connector 90 is needed, the auxiliary connector-side input connector 91 is connector-connected to the joint connector-side output connector 82, and the load connector 23 is connector-connected to the auxiliary connector-side output connector 92. With this, the expansion device 20B can be indirectly connected to the joint connector 80 via the auxiliary connector 90.

(8) The standby connector 60 is connector-connectable to any of the load connector 23, the joint connector-side input connector 81, and the auxiliary connector-side input connector 91. As such, only the necessary number of expansion devices 20B can be connected to the single standby connector 60 when the need arises. With this, there is no need to increase the number of standby connectors 60 according to the number of expansion devices 20B to be retrofitted, thus making it possible to suppress the cost increase caused by the installation of such standby connectors 60.

(9) The electrical junction box 30 includes the expansion connector 33, and the harness-side connector 54 attached to an end portion of the expansion harness 50 is connector-connected to this expansion connector 33. Thus, due to the connector-connection between the harness-side connector 54 and the expansion connector 33, the expansion harness 50 is electrically connected to the electrical junction box 30. Therefore, by disconnecting the connector-connection between the harness-side connector 54 and the expansion connector 33, it is possible to remove the expansion harness 50 from the electrical junction box 30. Therefore, the type (for example, the wire length type) of the expansion harness 50 can be selected as appropriate according to the specifications of the vehicle V, and the like.

Other Embodiments

The present embodiment can be implemented in the following modifications. The present embodiment and the following modifications can be implemented in combinations to the extent that they do not technically inconsistent.

In the present embodiment, the expansion harness 50 is electrically connected to the electrical junction box 30 by connector-connecting the harness-side connector 54 of the expansion harness 50 to the expansion connector 33 provided in the electrical junction box 30, but the present invention is not limited to this. For example, the structure of connection between the expansion harness 50 and the electrical junction box 30 is not particularly limited as long as the expansion harness 50 and the electrical junction box 30 can be electrically connected to each other.

Figure 6:
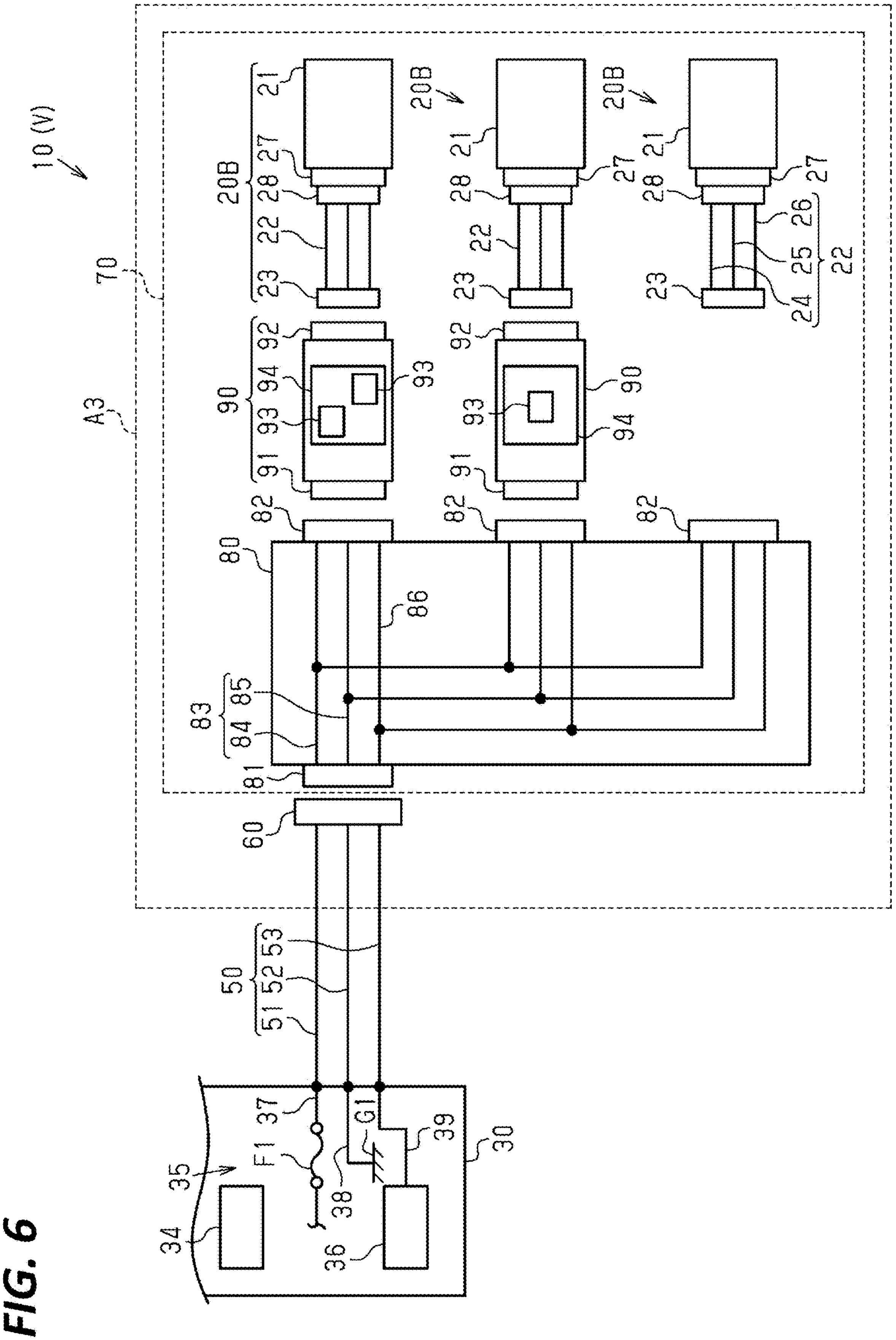
FIG. 6 is a diagram schematically illustrating a configuration of the wiring system according to a modification.

For example, as shown in FIG. 6, one end portion of the expansion harness 50 in the length direction thereof may be formed in one piece with the electrical junction box 30. For example, one end portion of the expansion harness 50 in the length direction thereof may be physically connected to the power supply line 37, the ground line 38, and the signal line 39 by ultrasonic welding or the like. In this modification, for example, one end portion of the power supply wire 51 in the length direction thereof is physically connected to the power supply line 37, one end portion of the ground wire 52 in the length direction thereof is physically connected to the ground line 38, and one end portion of the signal wire 53 in the length direction thereof is physically connected to the signal line 39. In this case, the expansion harness 50 cannot be removed from the electrical junction box 30. Note that the expansion harness 50 is physically connected to the electrical junction box 30 from the initial state before the expansion device 20B is retrofitted. In the wiring system 10 of this modification, the expansion connector 33 and the harness-side connector 54 shown in FIG. 2 are omitted.

In the foregoing embodiment, one end portion of the load harness 22 in the length direction thereof is formed in one piece with the expansion load 21, but the present invention is not limited to this. For example, the structure of connection between the load harness 22 and the expansion load 21 is not particularly limited as long as the load harness 22 and the expansion load 21 can be electrically connected to each other.

For example, a configuration is also possible in which, as shown in FIG. 6, a connector 27 is provided on the expansion load 21, and a connector 28, which is connector-connectable to the connector 27, is attached to one end portion of the load harness 22 in the length direction thereof. The connector 28 is provided in an end portion of the load harness 22 in the length direction thereof opposite to the load connector 23. In this case, when the connector 27 is connector-connected to the connector 28, the load harness 22 is electrically connected to the expansion load 21.

In the foregoing embodiment, two of the three expansion devices 20B are connected to the joint connector 80 via the auxiliary connector 90, and the remaining one expansion device 20B is directly connected to the joint connector 80, but the present invention is not limited to this. For example, all the three expansion devices 20B may be connected to the joint connector 80 via the auxiliary connectors 90. For example, all the three expansion devices 20B may be directly connected to the joint connector 80 without any auxiliary connector 90.

The joint connector 80 of the foregoing embodiment includes three joint connector-side output connectors 82, but the number of joint connector-side output connectors 82 is not particularly limited. The number of joint connector-side output connectors 82 may be suitably changed based on the number of expansion devices 20B connected to the joint connector 80 directly or indirectly. The number of joint connector-side output connectors 82 may be two, or four or more.

The configuration of the joint connector 80 of the foregoing embodiment may be suitably changed. For example, the joint connector 80 may have a configuration in which it includes a circuit part other than the joint connector-side power supply distribution unit 83. For example, the joint connector 80 may have a configuration in which it includes a fuse and a control function unit similar to the control function unit 93.

The wiring system 10 of the foregoing embodiment includes one standby connector 60, but the number of standby connectors 60 is not limited.

Figure 7:
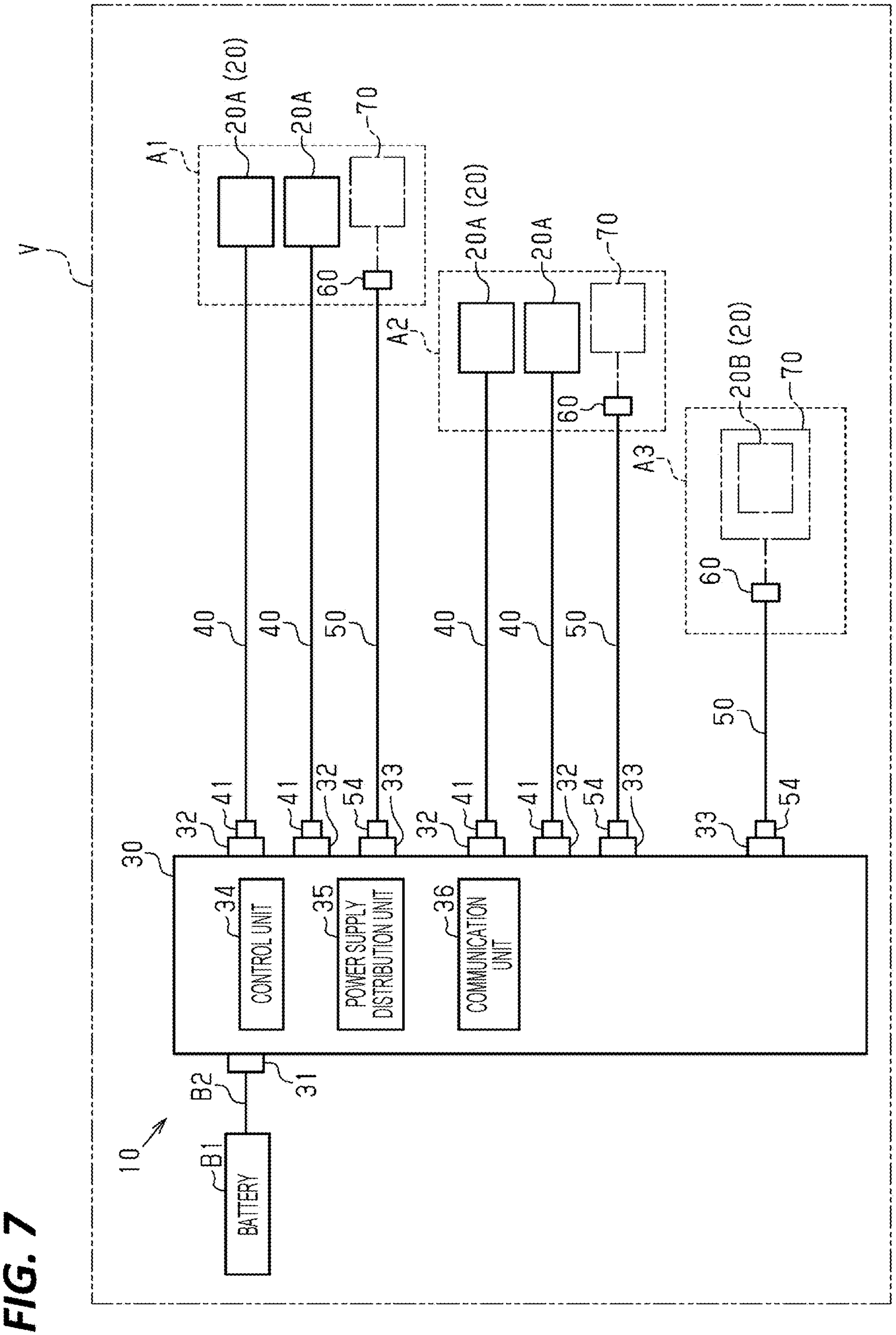
FIG. 7 is a diagram schematically illustrating a configuration of the wiring system according to a modification.

For example, as shown in FIG. 7, the wiring system 10 may include a plurality of (three, in this modification) standby connectors 60. The wiring system 10 of this modification includes a plurality of expansion harnesses 50 individually connected to the electrical junction box 30, and the plurality of standby connectors 60 respectively attached to end portions of the plurality of expansion harnesses 50. The plurality of standby connectors 60 are respectively attached to end portions of the different expansion harnesses 50. In other words, a single standby connector 60 is attached to the end portion of each expansion harness 50 in the length direction thereof. The plurality of standby connectors 60 are provided, for example, in different installation areas of the vehicle V. The three standby connectors 60 of this modification are respectively provided in the three installation areas A1, A2, and A3. In other words, a plurality of standby connectors 60 are provided in a distributed manner in the plurality of installation areas A1, A2, and A3. The standby connector 60 provided in the installation area Al is electrically connected to, for example, the expansion unit 70 to be retrofitted in the installation area A1, through connector connection. The standby connector 60 provided in the installation area A2 is electrically connected to, for example, the expansion unit 70 to be retrofitted in the installation area A2, through connector connection. The standby connector 60 provided in the installation area A3 is electrically connected to, for example, the expansion unit 70 to be retrofitted in the installation area A3, through connector connection.

The electrical junction box 30 of this modification includes a plurality of (three, in this modification) expansion connectors 33. A plurality of expansion harnesses 50 are respectively connected to the plurality of expansion connectors 33. In other words, a single expansion harness 50 is connected to each expansion connector 33. Specifically, the harness-side connector 54 of the expansion harness 50 is connector-connected to the expansion connector 33.

According to this configuration, the plurality of standby connectors 60 can be arranged in a distributed manner in the plurality of installation areas A1, A2, and A3, which are different from each other. Therefore, the plurality of standby connectors 60 can be provided in the respective installation areas A1, A2, and A3 in which the expansion unit 70 is to be installed. Accordingly, for example, even if the expansion units 70 are retrofitted to the plurality of installation areas A1, A2, and A3, the standby connectors 60 can be provided near the respective expansion units 70. This makes it possible to make connection work between the expansion units 70 and the standby connectors 60 easy. For example, when retrofitting an expansion unit 70, by connector-connecting the expansion unit 70 to the standby connector 60 located closest thereto, it is possible to reduce the wiring length of the wire connected from the standby connector 60 to the expansion device 20B of the expansion unit 70. This also eliminates the need to route the wire (for example, the load harness 22 shown in FIG. 2) for connecting the expansion device 20B to the standby connector 60 across the plurality of installation areas A1 to A3. Accordingly, the load harness 22 (see FIG. 2) can be easily routed, and the connection work between the expansion units 70 and the standby connectors 60 can be made easy.

In the foregoing embodiment, the load connector 23 is configured to be connector-connectable to any of the standby connector 60, the joint connector-side output connector 82, and the auxiliary connector-side output connector 92, but the present invention is not limited to this. For example, a configuration is also possible in which the load connector 23 is not connector-connectable to the standby connector 60 but is connector-connectable to the joint connector-side output connector 82 and the auxiliary connector-side output connector 92. In this case, for example, the expansion device 20B is not directly connected to the standby connector 60 but is always connected to the standby connector 60 via the joint connector 80 or the auxiliary connector 90.

In the foregoing embodiment, the auxiliary connector-side input connector 91 is configured to be connector-connectable to any of the standby connector 60 and the joint connector-side output connector 82, but the present invention is not limited to this. For example, a configuration is also possible in which the auxiliary connector-side input connector 91 is not connector-connectable to the standby connector 60 but is connector-connectable to the joint connector-side output connector 82. In this case, for example, the auxiliary connector 90 is not directly connected to the standby connector 60 but is always connected to the standby connector 60 via the joint connector 80.

In the foregoing embodiment, the standby connector 60 is configured to be connector-connectable to any of the joint connector-side input connector 81, the auxiliary connector-side input connector 91, and the load connector 23, but the present invention is not limited to this. For example, a configuration is also possible in which the standby connector 60 is not connector-connectable to the joint connector-side input connector 81 but is connector-connectable to the auxiliary connector-side input connector 91 and the load connector 23. In this case, it is not possible to connect a plurality of expansion devices 20B to the standby connector 60.

In the foregoing embodiment, the expansion harness 50 has a configuration in which it includes the power supply wire 51, the ground wire 52, and the signal wire 53, but the present invention is not limited to this. For example, the expansion harness 50 may have a configuration in which it further includes a wire different from the power supply wire 51, ground wire 52, and signal wire 53. For example, the expansion harness 50 may have a configuration in which it includes only the power supply wire 51 and the ground wire 52. For example, the expansion harness 50 may have a configuration in which it includes only the signal wire 53.

In the foregoing embodiment, the standby connector 60 is a male connector, and the joint connector-side input connector 81, the auxiliary connector-side input connector 91, and the load connector 23 are female connectors, but the present invention is not limited to this. For example, the standby connector 60 may be a female connector, and the joint connector-side input connector 81, the auxiliary connector-side input connector 91, and the load connector 23 may be male connectors.

The configuration of the electrical junction box 30 of the foregoing embodiment may be suitably changed. For example, the electrical junction box 30 may have a configuration in which it includes a circuit part other than the control unit 34, the power supply distribution unit 35, and the communication unit 36. For example, the ground line 38 may be omitted. In this case, for example, the ground wire 52 may be connected to the ground position G1.

In the wiring system 10 of the foregoing embodiment, the number of electrical devices 20 connected to the electrical junction box 30 is not particularly limited.

In the foregoing embodiment, the electrical junction box 30 is embodied in an electrical junction box that directly receives power from the battery B1, but the present invention is not limited to this. For example, the electrical junction box 30 may be embodied in an electrical junction box that receives power from an electrical junction box other than the electrical junction box 30. For example, the electrical junction box 30 may also be embodied in a zone ECU installed in each installation area of the vehicle V.

In the foregoing embodiment, the electrical junction box 30 need not be provided in the plurality of installation areas A1, A2, and A3 where the electrical device 20 is disposed.

In the foregoing embodiment, the plurality of installation areas A1, A2, and A3 may be formed as spaces independent or separated from each other.

In the foregoing embodiment, the standard harness 40 may have a length that allows it to be routed from the electrical junction box 30 to, among the installation areas A1, A2, and A3, an installation area where the standard device 20A is disposed. For example, the standard harness 40 may have a length equal to the distance of a wire routed from the electrical junction box 30 to, among the installation areas A1, A2, and A3, the installation area where the standard device 20A is disposed. The expansion harness 50 may have a length that allows it to be routed from the electrical junction box 30 to, among the installation areas A1, A2, and A3, an installation area (e.g., A1) where the standby connector 60 is disposed. For example, the expansion harness 50 may have a length equal to the distance of a wire routed from the electrical junction box 30 to, among the installation areas A1, A2, and A3, the installation area (e.g., A3) where the standby connector 60 is disposed. In an example, the expansion harness 50 may also have a length that is not sufficient to be routed from the electrical junction box 30 to the installation area (e.g., A1) where the standard device 20A is disposed.

In the foregoing embodiment, either of the standard device 20A and the standby connector 60 or both of the standard device 20A and the standby connector 60 may be disposed in one of the plurality of installation areas A1, A2, and A3.

In the foregoing embodiment, among the plurality of installation areas, an installation area where the standby connector 60 is disposed is provided only with one standby connector 60.

The embodiments disclosed herein should be considered as being illustrative in all respects and not restrictive. The scope of the invention is defined by the claims, instead of in the sense given above, and is intended to include all modifications within the meaning and scope equivalent to the claims.

LIST OF REFERENCE NUMERALS

10 Wiring system
20 Electrical device
20A Standard device
20B Expansion device
21 Expansion load
22 Load harness
23 Load connector
24 Load-side power supply wire
25 Load-side ground wire
26 Load-side signal wire
27, 28 Connector
30 Electrical junction box
31 Power receiving terminal
32 Standard connector
33 Expansion connector
34 Control unit
35 Power supply distribution unit

36 Communication unit
37 Power supply line
38 Ground line
39 Signal line
40 Standard harness
41 Standard harness-side connector
50 Expansion harness
51 Power supply wire
52 Ground wire
53 Signal wire
54 Harness-side connector
60 Standby connector
70 Expansion unit
80 Joint connector
81 Joint connector-side input connector
82 Joint connector-side output connector
83 Joint connector-side power supply distribution unit
84 Power supply line
85 Ground line
86 Signal line
90 Auxiliary connector
91 Auxiliary connector-side input connector
92 Auxiliary connector-side output connector
93 Control function unit
94 Circuit substrate
A1, A2, A3 Installation area
B1 Battery
B2 Wire
F1 Fuse
G1 Ground position
V Vehicle

What is claimed is:

1. A wiring system that is installed in a vehicle, the wiring system comprising:

an electrical junction box;

a standard harness electrically connecting the electrical junction box and a standard device;

an expansion harness electrically connected to the electrical junction box; and a single standby connector which is connected to a single connector attached to an end portion of the expansion harness, wherein the expansion harness does not have any branching connection section at a position of the expansion harness in a length direction thereof, is not physically connected to the standard harness, and is provided independently from the standard harness, and is electrically connected to an expansion unit that is connected to the vehicle, and the expansion unit includes at least one expansion device, when the expansion unit includes one expansion device, the expansion device is connected to the standby connector, and when the expansion unit includes a plurality of expansion devices, the expansion unit further includes a joint connector electrically connected to the standby connector, and the expansion devices are connected to the joint connector.

2. The wiring system according to claim 1, wherein the electrical junction box includes a power supply line, a ground line, and a signal line, and the expansion harness includes: a power supply wire electrically connected to the power supply line; a ground wire electrically connected to the ground line; and a signal wire electrically connected to the signal line.

3. The wiring system according to claim 1, comprising:

a plurality of the expansion harnesses individually connected to the electrical junction box; and a plurality of the standby connectors respectively attached to end portions of the plurality of expansion harnesses, wherein the plurality of standby connectors are provided in different installation areas of the vehicle.

4. A wiring system that is installed in a vehicle, the wiring system comprising:

an electrical junction box;

a standard harness electrically connecting the electrical junction box and a standard device;

an expansion harness electrically connected to the electrical junction box; and a single standby connector which is connected to a single connector attached to an end portion of the expansion harness, wherein the expansion harness does not have any branching connection section at an intermediate position of the expansion harness in a length direction thereof, is not physically connected to the standard harness, and is provided independently from the standard harness, and is electrically connected to an expansion unit that is connected to the vehicle, and the expansion unit includes at least one expansion device, when the expansion unit includes one expansion device, the expansion device is connected to the standby connector, and when the expansion unit includes a plurality of expansion devices, the expansion unit further includes a joint connector electrically connected to the standby connector, and the expansion devices are connected to the joint connector, wherein the at least one expansion device each includes: an expansion load to be retrofitted to the vehicle, a load harness electrically connected to the expansion load, and a load connector attached to an end portion of the load harness, and the load connector is connector-connectable to the standby connector.

5. The wiring system according to claim 4, wherein the joint connector includes: a single joint connector-side input connector connector-connected to the standby connector; a plurality of joint connector-side output connectors that are connector-connectable to the load connector; and a joint connector-side power supply distribution unit configured to distribute power input to the joint connector-side input connector to the plurality of joint connector-side output connectors.

6. The wiring system according to claim 5, wherein the expansion unit further includes an auxiliary connector electrically connected to any of the joint connector-side output connectors, and the auxiliary connector includes: a control function unit configured to control an operation of the expansion device; an auxiliary connector-side input connector connector- connected to the joint connector-side output connector; and an auxiliary connector-side output connector connector-connectable to the load connector.

7. The wiring system according to claim 6, wherein when the expansion unit includes the plurality of expansion devices respectively electrically connected to the plurality of joint connector-side output connectors, the load connectors of the plurality of expansion devices are connector-connectable to the respective joint connector-side output connectors, and are connector-connectable to the auxiliary connector-side output connector.

8. The wiring system according to claim 4, wherein the expansion unit further includes an auxiliary connector electrically connected to the standby connector, and the auxiliary connector includes: a control function unit configured to control an operation of the expansion device; an auxiliary connector-side input connector connector- connected to the standby connector; and an auxiliary connector-side output connector connector-connected to the load connector.

9. A wiring system that is installed in a vehicle, the wiring system comprising:

an electrical junction box;

a standard harness electrically connecting the electrical junction box and a standard device;

an expansion harness electrically connected to the electrical junction box; and a single standby connector which is connected to a single connector attached to an end portion of the expansion harness, wherein the expansion harness does not have any branching connection section at an intermediate position of the expansion harness in a length direction thereof, is not physically connected to the standard harness, and is provided independently from the standard harness, and is electrically connected to an expansion unit that is connected to the vehicle, and the expansion unit includes at least one expansion device, when the expansion unit includes one expansion device, the expansion device is connected to the standby connector, and when the expansion unit includes a plurality of expansion devices, the expansion unit further includes a joint connector electrically connected to the standby connector, and the expansion devices are connected to the joint connector, wherein the electrical junction box includes:

a standard connector electrically connected to the standard harness; and an expansion connector electrically connected to the expansion harness, a harness-side connector is attached to an end portion of the expansion harness in a length direction thereof that is opposite to the standby connector, and the harness-side connector is connector-connected to the expansion connector.

* * * * *